W. E. NAGEBORN.
CARBURETER.
APPLICATION FILED DEC. 21, 1907.
994,687.
Patented June 6, 1911.
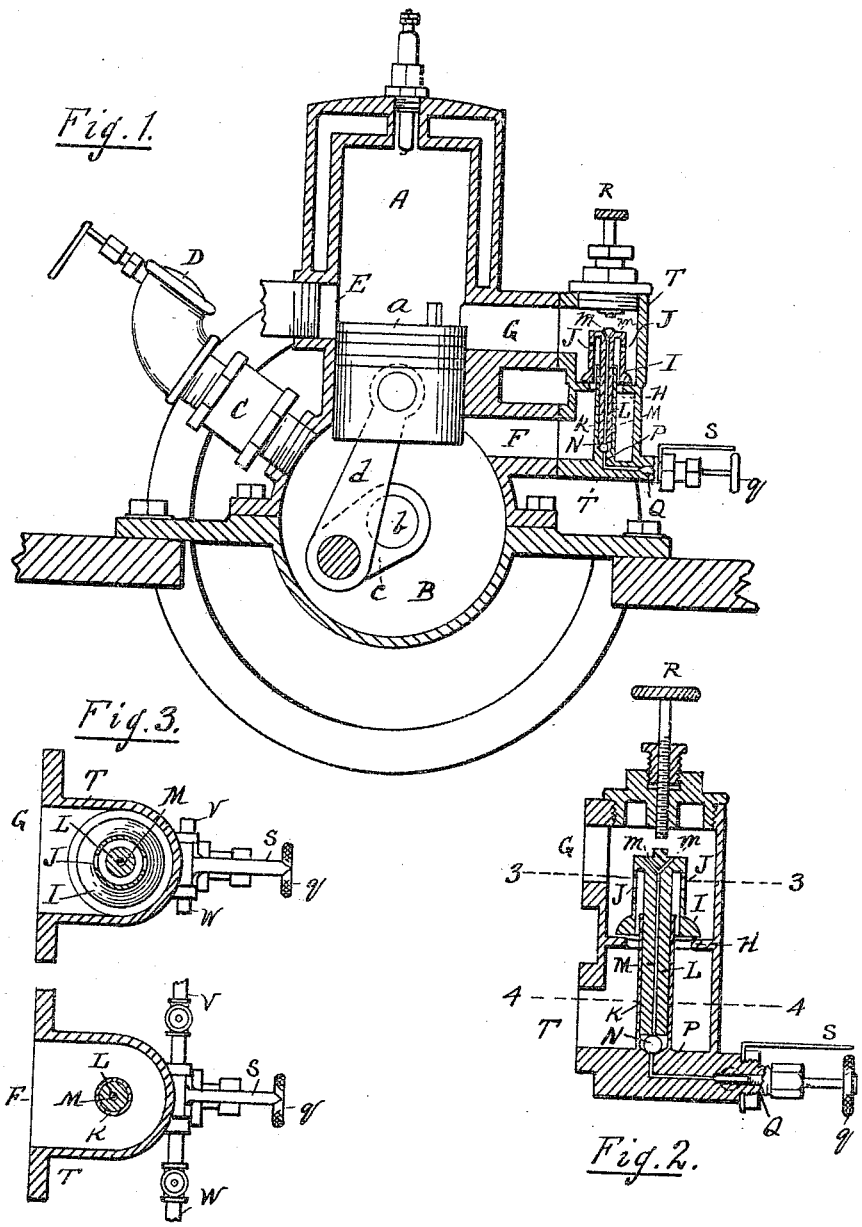

UNITED STATES PATENT OFFICE.

WILLIAM E. NAGEBORN, OF DETROIT, MICHIGAN, ASSIGNOR TO GRAY MOTOR COMPANY, OF DETROIT, MICHIGAN, A CORPORATION OF MICHIGAN.

CARBURETER.

994,687.

Specification of Letters Patent.    Patented June 6, 1911.

Application filed December 21, 1907. Serial No. 407,598.

*To all whom it may concern:*

Be it known that I, WILLIAM E. NAGEBORN, citizen of the United States, residing at Detroit, county of Wayne, State of Michigan, have invented a certain new and useful Improvement in Carbureters, and declare the following to be a full, clear, and exact description of the same, such as will enable others skilled in the art to which it pertains to make and use the same, reference being had to the accompanying drawings, which form a part of this specification.

My invention relates to carbureters, and consists in the improvements hereinafter described and pointed out in the claims.

In the accompanying drawings: Figure 1 is a section in a vertical plane of an internal combustion engine and a carbureter embodying my invention attached thereto. Fig. 2, is an enlarged sectional view of the carbureter. Fig. 3, is a section in the plane indicated by the line 3, 3, Fig. 2. Fig. 4, is a section in the plane indicated by the line, 4, 4 Fig. 2.

A, is the cylinder of a gas engine and B, is the crank case.

C, represents the inlet apparatus which includes an inwardly opening non-return valve of the usual construction, which is not shown in detail, as it is well understood.

D, is a throttle valve controlling the inlet passage to the crank case B.

$a$ is a piston adapted to reciprocate in the cylinder A.

$b$, is the main shaft; $c$, the crank and $d$, the connecting rod of the gas engine.

The gas engine, as will be seen by its construction, operates as a two cycle engine.

F, is a passage leading from the crank case, and G, is a passage opening into the cylinder above the piston $a$, when the piston is at the end of its working stroke. The casing T, is interposed between the outer ends of the passages F and G, and unites said passages so that the air compressed in the crank case will flow through said casing into the cylinder above the piston $a$.

E, is the exhaust port.

H, indicates a port formed in the casing T midway between the passages F and G.

I, is a valve adapted to nearly, but not quite, close the port H. The valve I, is bored out from its lower end to form a cylindrical cavity therein.

J, J, are apertures formed through the wall of the valve I, opening within its interior cavity and above said valve.

K is a tube concentric with the valve I and fixed to the lower part of the casing T.

L, is a valve stem extending from the upper part of the valve I fitting and adapted to slide in the tube K.

M, is an aperture formed through the valve stem L, and opening at the top of the valve I, in small passages $m$, $m$ as shown in the drawings.

The tube K, extends above the valve seat H, and is always within the valve I, but it does not fit tight in the cavity of said valve, but leaves some space between its outer wall and the wall of the said cavity.

P, is a conduit for the admission of the fluid constituting the fuel for the engine as, for instance, gasolene or kerosene, and I provide a pipe V, for gasolene and a pipe W, for kerosene so that either may be supplied to the engine as required.

N, is a ball-valve opening into the hollow of the tube K, and adapted to close the inner end of the conduit P.

Q. is a needle valve which may be operated by the hand-wheel $q$, adapted to control the passage through the conduit P.

S, is a pointer adapted to indicate the amount the hand-wheel $q$, has been turned.

The stem L, rests upon the ball of the valve N, when the valve I, is at its lowest position, so as to hold the valve I slightly off its seat.

The operation of the above described device is as follows: As the piston $a$, ascends it draws air into the crank case B, past the throttle valve D and through the inlet apparatus C. When the piston $a$, descends it compresses the air in the crank case B, and the pressure of this air is transmitted past the valve I, and through passages J, J, so that the pressure of the air above the valve I, is equal to that below it. As soon as the piston passes by the mouth of the passage G, the compressed air rushes from the crank case B, raises the valve I, farther from its seat and draws some fluid into the lower part of the tube K, as the stem L, acts like a plunger in the tube K. When the pressure below the piston $a$, on the up stroke of the same, falls the valve I, returns to its seat, forces some of the fuel through the passage M, and out at the passages $m$, upon the surface of said valve to be swept off, this surface and vaporized by the air flowing through the passage on the down stroke of the piston.

The travel of the valve I, may be regulated by an adjusting screw R, adapted to contact the upper end of the valve I, to limit the upward travel of the same.

It will be observed that by the above device the inlet valve I, is made to actuate a pump for the supply of fuel to the charge.

The fuel for a single charge is thrown into the passage G, or the connecting part of the casing at the commencement of or during the up-stroke of the piston and it has time to get thoroughly heated by contact with the walls of the passage and by the heat of the gases in said passage before the next charge of air is passed into the cylinder so that it is easily vaporized.

I have found that by this device kerosene may be used for fuel and is thoroughly vaporized and that the engine works well giving out as much power, or more power, with kerosene as with gasolene.

What I claim is:

1. In an internal combustion engine having an admission passage for the charge, an intake passage for liquid fuel, a tube adapted to act as the cylinder of a pump, said passage for fluid opening into said tube, a non return valve governing said passage, a part interposed in said admission passage for the charge and adapted to be actuated in one direction by the charge passing through said admission passage and to return to its normal position after the charge has passed, said part having a plunger attached thereto extending into said tube and adapted to act to force a portion of said fluid into the admission passage for the charge, on the return motion of said part.

2. In an internal combustion engine having a cylinder and compression chamber and adapted to compress air in said chamber and provided with a passage for the charge between said chamber and cylinder, said passage having a contracted portion, a valve adapted to vary the area of opening through said contracted portion and to be actuated by the charge passing therethrough to enlarge said opening and to return to its normal position, a pump adapted to deliver fuel into said passage, said valve being so connected to said pump as to actuate it on its return, substantially as and for the purpose described.

3. In an internal combustion engine having a cylinder and compression chamber and adapted to compress air in said chamber and provided with a passage for the charge between said chamber and cylinder, said passage having a contracted portion, a valve adapted to vary the area of opening through said contracted portion and to be actuated by the charge passing therethrough to enlarge said opening and to return to its normal position, a pump adapted to deliver fuel into said passage, said valve being so connected to said pump as to actuate it on its return, and means for adjusting the travel of said valve.

4. In an internal combustion engine having a cylinder and compression chamber and adapted to compress air in said chamber and provided with a passage for the charge between said chamber and cylinder, said passage having a contracted portion, a valve located in said passage adapted to vary the area of opening through said contracted portion and to be actuated by the charge passing therethrough to enlarge said opening and to return to its normal position, a stem extending from said valve having a passage M therethrough, a pump cylinder K, said valve stem being adapted to fit and reciprocate in said cylinder, substantially as and for the purpose described.

5. In an internal combustion engine, a passage for the admission of fluid for fuel, a tube adapted to act as the cylinder of a pump, said passage opening into said tube, a non-return valve governing said passage, a valve to said engine having a stem adapted to act as a plunger in said tube, said valve to the engine being adapted to contact said non-return valve to hold the same against its seat toward the closed position of said valve to the engine.

6. In an internal combustion engine having an intake passage for the charge, a part located in said passage and adapted to be actuated in one direction by the charge passing therethrough and to return to its normal position after the charge has passed, a pump adapted to deliver liquid fuel into said intake passage, said part being connected to said pump so as to actuate the same to deliver its charge on its return motion.

In testimony whereof, I sign this specification in the presence of two witnesses.

WILLIAM E. NAGEBORN.

Witnesses:
ALECIA TOWNSEND,
ELLIOTT J. STODDARD.